March 12, 1968  D. A. EBERWINE  3,372,547
MULTIPLUG ROCKET ENGINE
Filed Oct. 21, 1965  4 Sheets-Sheet 1

INVENTOR.
DONALD A. EBERWINE
BY
*Gary D. Fields*
ATTORNEY

March 12, 1968  D. A. EBERWINE  3,372,547
MULTIPLUG ROCKET ENGINE
Filed Oct. 21, 1965  4 Sheets-Sheet 2

INVENTOR.
DONALD A. EBERWINE
BY
*Gary D. Fields*
ATTORNEY

INVENTOR.
DONALD A. EBERWINE
BY Gary D. Fields
ATTORNEY

March 12, 1968

D. A. EBERWINE 3,372,547

MULTIPLUG ROCKET ENGINE

Filed Oct. 21, 1965

INVENTOR.
DONALD A. EBERWINE
BY
*Gary D. Fields*
ATTORNEY

United States Patent Office 3,372,547
Patented Mar. 12, 1968

3,372,547
MULTIPLUG ROCKET ENGINE
Donald A. Eberwine, Aurora, Colo., assignor to Martin-Marietta Corporation, New York, N.Y., a corporation of Maryland
Filed Oct. 21, 1965, Ser. No. 499,713
14 Claims. (Cl. 60—258)

ABSTRACT OF THE DISCLOSURE

This is an extremely short rocket engine formed basically of a number of spaced plugs geometrically arranged to provide a number of interconnected rocket nozzle areas. Each plug supplies either oxidizer or fuel to the combustion chamber and a manifold supplies the other of the oxidizer or fuel.

---

This invention relates to a rocket engine and more particularly to an extremely short rocket engine utilizing a plurality of plug arrangements to provide a plurality of combustion areas.

The conventional engine consists of a unitary combustion chamber having a throat and expansion chamber, all of which vary in length and diameter depending on the operational characteristics and thrust desired. Thus, to increase thrust the rocket engine must be made larger by increasing the length and diameter thereof. As our nation's space program develops the need for engines which will develop more thrust continues. For example, with the requirement to orbit heavier payloads and to send spacecraft to the moon and the planets, the development of an engine which will provide the needed thrust becomes critical. Eventually, a point is reached where an increase of the length and/or diameter becomes prohibitive from a structural standpoint. Various attempts have been made to overcome this deficiency in the rocket engines and space vehicle design. One solution has been to use "strap-ons," i.e., attach several smaller rockets to a larger center core booster. With this concept the smaller rockets are ignited first and when they burn out, they separate from the center core which is then ignited. Another concept is to utilize a cluster of smaller rocket engines on a single vehicle. However, such attempts have not been entirely satisfactory. For example, the cost of either concept may be in many instances prohibitive and the problems of supplying fuel thereto are often complicated and not wholly satisfactory.

Among the objects of the present invention are to provide a rocket engine having the advantages of a multi-unit engine but not the disadvantages thereof; to provide such a rocket engine in which a plurality of plugs are geometrically arranged to provide a plurality of combustion chamber areas, throats and expansion chambers therebetween all of which are interconnected; to provide such a rocket engine in which each plug supplies oxidizer or fuel to the combustion chamber and a manifold provides the other of the oxidizer or fuel to the combustion chamber; to provide such a rocket engine in which the plugs are constructed so that the oxidizer or fuel flows through the walls thereof to provide cooling of the combustion chamber, throat and exit nozzle; to provide such a rocket engine in which the walls thereof are made up of a plurality of tubes through which the oxidizer or fuel flows; to provide such a rocket engine in which the tubes are flattened at the throat to cause accelerated flow of the oxidizer or fuel at that point; to provide such a rocket engine which provides higher performance than the conventional rocket engines; to provide such a rocket engine which is cheaper to fabricate; and to provide such a rocket engine which is of simple construction.

Additional objects and novel features of this invention will become apparent from the description which follows when taken in conjunction with the accompanying drawings, in which.

Figure 4:
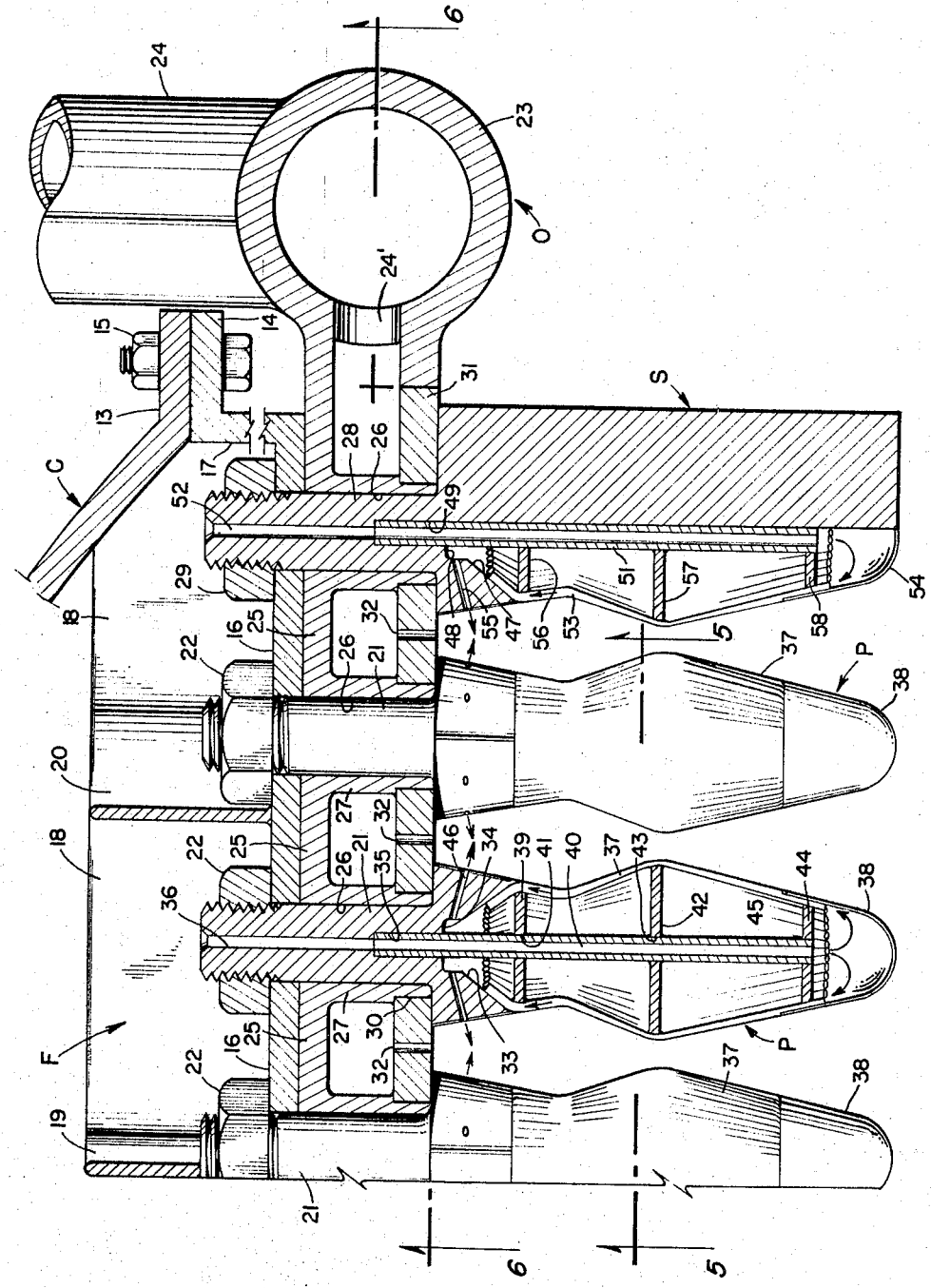
FIG. 4 is an enlarged, fragmentary, vertical section taken along line 4—4 of FIG. 3 showing further details of the plug and manifold construction.

In accordance with this invention, an array of plugs P are attached to, and extend through a fuel manifold F with an oxidizer manifold O therebetween, as shown in FIG. 4. The plugs P are shaped to form a plurality of combustion chambers, and throat chamber areas therebetween and conveniently are only a few inches long, say 12 inches or less. Thus, this engine is capable of providing a large amount of thrust while retaining a short height. This arrangement advantageously provides more room for the payload and avoids certain structural problems inherent in a long engine. Also, the associated problems of manufacture and assembly are reduced.

Figure 1:
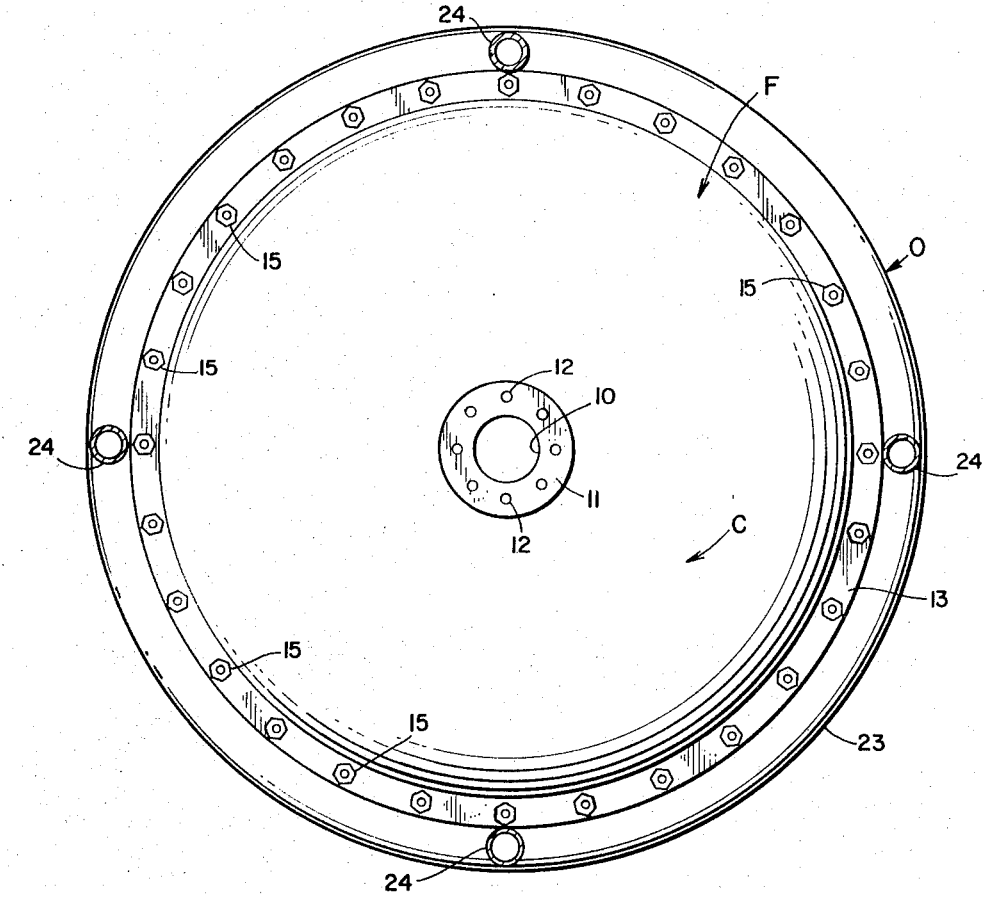
FIG. 1 is a top plan view of the multiplug engine of this invention.
Figure 2:
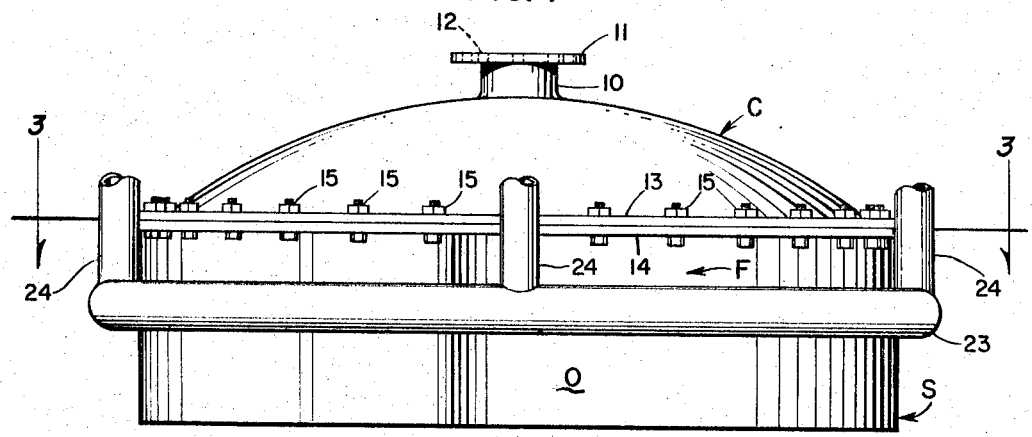
FIG. 2 is a side elevation of the multiplug engine of FIG. 1.

Fuel is supplied through an inlet 10, seen in FIGS. 1 and 2, in the top of cover C and has a peripheral flange 11 for attachment to the fuel tank. The lower edge of cover C has a peripheral flange 13 for connection to flange 14 on the fuel manifold F, as by a plurality of spaced bolts 15.

Figure 3:
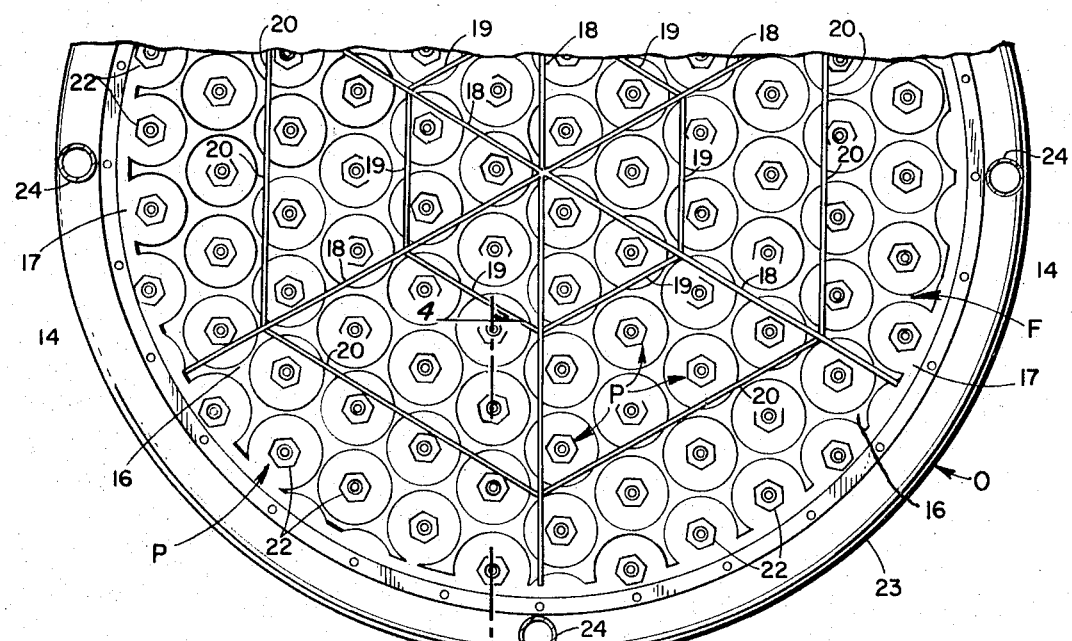
FIG. 3 is a fragmentary horizontal section, on a slightly larger scale, taken along line 3—3 of FIG. 2 showing the construction of the manifold and the arrangement thereof with respect to the plugs.
Figure 5:
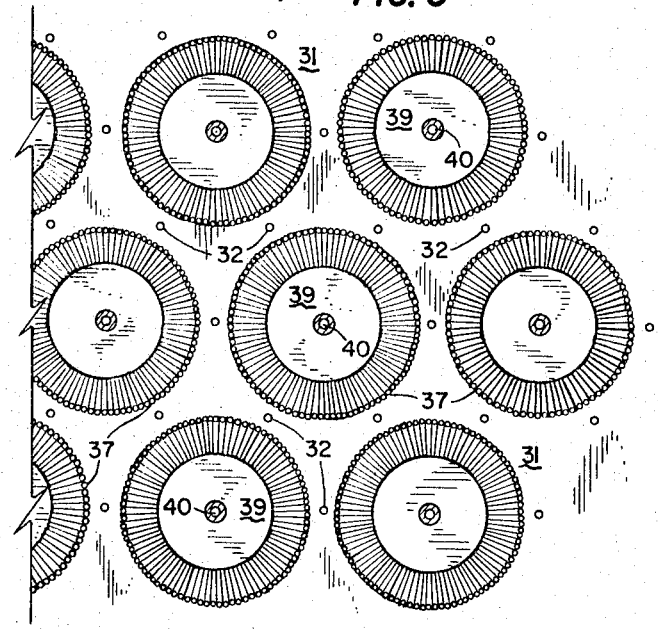
FIG. 5 is a fragmentary horizontal section, taken along line 5—5 of FIG. 4 showing the arrangement of the plugs and the fuel openings.

The fuel manifold has a circular base plate 16 bounded by a peripheral side wall 17 formed integrally therewith, as in FIG. 4. The side wall may be formed separately and welded to base 16, but by forming it in one piece the welding operation is eliminated and a leak-proof manifold is assured. This fuel manifold F may be divided into sectors, such as by baffles 18, which divide the manifold into six pie shaped sectors. These baffles serve as structural members for transferring the thrust from the engine to the vehicle and may be utilized to control the flow of fuel to the plugs so that more fuel may be provided to some sectors than to other sectors for thrust vectoring purposes. These baffles are interconnected by inner dividers 19 and outer dividers 20, as best seen in FIG. 3 which provide added strength and provide means whereby the fuel can be supplied to concentric rings, as it were, as defined by these dividers, so that the total thrust can be varied by supplying fuel to some of the rings and not to other rings. Of course, it will be understood that the number of baffles and dividers may be varied, depending on the size and requirements of the engine.

Figure 6:
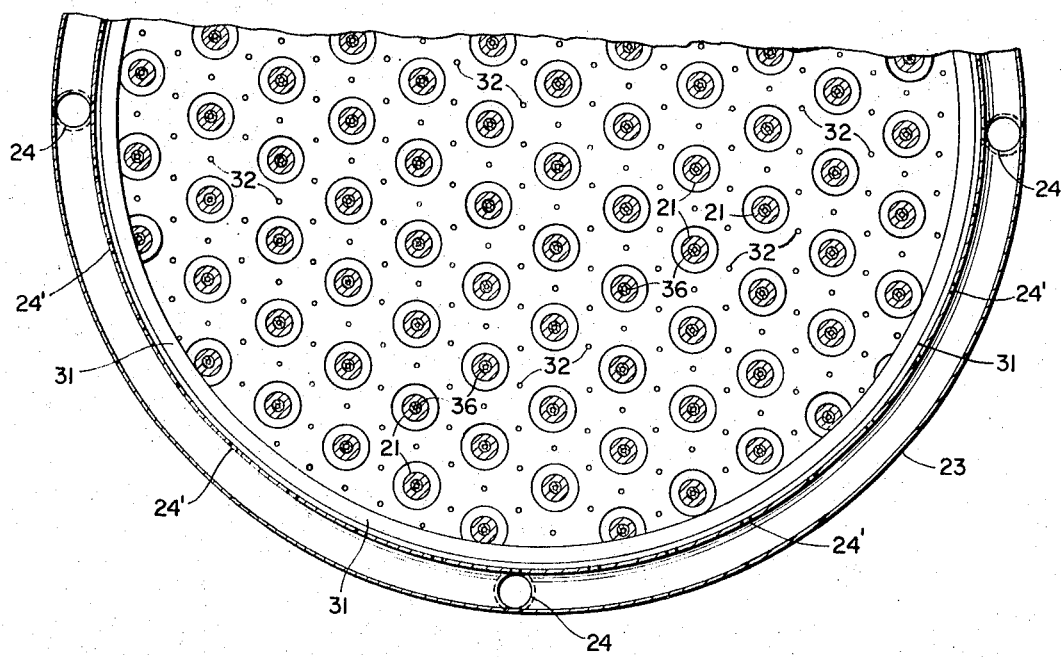
FIG. 6 is a fragmentary, horizontal section on a reduced scale, taken along line 6—6 of FIG. 4, showing details of the manifold construction.

The oxidizer manifold O is mounted below fuel manifold F and is held in place by plugs P, each of which has a stem 21 extending through the oxidizer manifold, in a manner to be described, and base 16 of the fuel manifold F. The plugs are secured by nuts 22 which are threadably received over the end of plug stems 21. The oxidizer manifold comprises a large annulus 23 extending around side wall 17 of fuel manifold F and is provided with a plurality of spaced inlets 24, as clearly seen in FIG. 1. The oxidizer is permitted to flow into the interior of manifold O through a plurality of spaced openings 24' in the inner wall of annulus 23, as seen in FIG. 6. An upper central web 25 forms the center of oxidizer manifold O and is conveniently formed integrally with annulus 23. The web 25 is provided with a plurality of holes 26 through which stems 21 of plugs P extend and have depending collars 27. A skirt S surrounds the plugs P having a circular outside surface and provided with an irregular inner surface forming fractional portions of additional plugs as the arrangement of the plugs requires, as seen in FIGS. 3 and 4. In each instance where the portion of the plug included in the skirt forms at least one half of a plug, this portion is provided with a stem, such as stem 28 of FIG. 4 which extends through a collar which has a threaded upper end for receiving a nut 29 for holding the skirt in place against the oxidizer manifold O.

Conveniently, the bottom of each collar 27 is provided with a reduced neck 30 for receiving a circular plate 31 which covers the bottom of oxidizer manifold O, as in FIGS. 4 and 6. In addition, plate 31 is provided with a series of holes 32 for permitting oxidizer to pass from the manifold to a combustion chamber formed between the upper portion of the plugs where it will combine with a hypergolic fuel in a manner to be described. Lower end of each stem 21 is enlarged, forming a flange which is drawn up against plate 31 to hold it in place when nuts 22 are tightened down. This stem is provided with a conical recess 33 extending upwardly from the lower end thereof and terminating in a central bore 34, as in FIG. 4. Bore 34 is provided with a counterbore 35 which is in communication with longitudinal passageway 36 for supplying fuel to the plugs in a manner to be described. The body of each plug is formed from a plurality of tubes 37 which are brazed together, the upper ends thereof being received within conical recess 33, as in FIG. 4. The lower ends thereof are covered by an end cap 38, which may be brazed to the lower ends of the tubes, or attached in some other suitable manner. The tubes are formed as shown and held in position by a plurality of spaced horizontal disks, such as upper disk 39 which is brazed to central tube 40 extending downwardly from counterbore 35 around the central opening 41 and the outer edge thereof is brazed to tubes 37. Similarly, a center disk 42, with a central opening 43, is provided at the throat of the combustion chamber area and a lower disk 44, with a central opening 45, is provided in the expansion area. Thus, the fuel from the fuel manifold F is fed through passageway 36 and tube 40 and into end cap 38 from which it is forced upwardly through tubes 37.

Conveniently, tubes 37 are flattened at center disk 42 so that the fuel passing therethrough is accelerated at this point to provide additional cooling since the throat is the hottest portion of the engine. When the fuel reaches bore 34 it is forced through a plurality of openings 46 into the combustion chamber where it combines with the oxidizer to ignite and provide the engine thrust. Conveniently, the fuel and oxidizer may be of a hypergolic nature so that they ignite upon contact without the necessity of a spark or other ignition means. Conveniently, openings 46 are equally spaced around each plug P and are arranged so that they inject fuel just below a hole 32 in plate 31 so that the oxidizer and fuel will come into direct contact thereby increasing the efficiency of the engine in that all of the fuel and oxidizer will be ignited and burn.

Similarly, those portions of skirt S containing plug portions have a conical recess 47 at the lower end of stem 28 which is provided with a central bore 48. In turn, this bore 48 is provided with a counterbore 49 for receiving a tube 51 which extends downwardly from the plug. Thus, fuel is supplied to the skirt through longitudinal passageway 52 in stem 28 and through tube 51 to the bottom of the skirt. The plug portion of the skirt is composed of a plurality of tubes 53 which are identical to tubes 37 and have the upper ends brazed to the side wall of recess 47 and the lower ends received within an end cap 54 and attached thereto as by brazing. The fuel is then fed through tubes 53 into bore 47 and out through openings 55 where it combines with oxidizer fed through holes 32 to burn in the combustion chamber to provide thrust. Advantageously, tubes 53 are also flattened at their central portions so that the flow of fuel therethrough is accelerated to provide additional cooling in the throat. The tubes are held in place by an upper disk portion 56, a center disk portion 57 and a lower disk portion 58 which are attached respectively to the tube 51 and tubes 53 in the same manner as upper disk 39, center disk 42 and lower disk 44 are connected respectively to tube 40 and tubes 37.

From the foregoing, it can be seen that the objects and novel features of this invention hereinbefore set forth have been fulfilled to a marked degree. A rocket engine has been provided which is of relatively simple construction but provides added thrust with less height. The engine is made up of a plurality of plugs which due to their configuration form a combustion chamber, throat and nozzle therebetween and are arranged to provide fuel to the combustion chamber and utilize this fuel for cooling the plugs by passing it through tubes which form the outer walls of the plugs. The oxidizer is supplied between the plugs and the arrangement of the holes in the oxidizer manifold is such that the oxidizer is supplied in the combustion chamber in direct contact with the fuel from the plugs to provide efficient ignition and burning. Furthermore, it can be seen by the arrangement of baffles in the fuel manifold suitable thrust vectoring may be provided without the necessity of gimbaling and also a variable amount of thrust may be provided to the whole engine by supplying fuel only to a portion of the plugs.

What is claimed is:
1. A multiplug rocket engine comprising:
 a base plate;
 a plurality of plugs arranged in parallel rows extending from one side of said base plate and having a configuration such that adjacent plugs form combustion chamber, throat and expansion chamber areas therebetween;
 a generally circular skirt extending from said plate and extending around said plugs, the interior wall thereof having a configuration conforming generally to the configuration of the side wall of each of said plugs and thereby providing a combustion chamber, throat and expansion chamber area between the outermost plugs and said interior wall;
 means supplying fuel to said combustion chambers; and
 means supplying oxidizer to said combustion chambers, said fuel and oxidizer igniting upon mixing in said combustion chamber and being forced through said nozzle for expansion in said expansion chamber to provide thrust.

2. A multiplug rocket engine, as set forth in claim 1, wherein:
 said fuel supplying means comprises a fuel manifold;
 said oxidizer supplying means comprises an oxidizer manifold, said plugs each extending through one of said manifolds into the other of said manifolds;
 means in each of said plugs for supplying fuel or oxidizer from said other manifold to said combustion chamber;
 and openings in said one manifold for supplying the other of said fuel and oxidizer to said combustion chamber.

3. A multiplug rocket engine, as set forth in claim 2, wherein each said plug includes:
 a stem extending through said manifolds and having a central passageway therethrough, the lower end of said stem having a generally conical shaped recess therein;
 an outer wall formed as a plurality of tubes extending from said conical recess to the bottom of said plug and being formed in a configuration so that adjacent plugs form combustion chamber, throat and expansion chamber areas therebetween;
an end cap covering the bottom of said plurality of tubes so that said fuel or oxidizer is fed through said central passageway into said end caps and through said plurality of tubes into said recess; and
at least one opening extending through the side wall of said plug adjacent said recess to permit flow of said oxidizer or fuel from said conical recess into said combustion chamber area.

4. A multiplug rocket engine, as set forth in claim 3, including:
a central tube extending downwardly from said central passageway to a point within said end cap to provide flow of said fuel or oxidizer through the center of said plug.

5. A multiplug rocket engine, as set forth in claim 4, including a plurality of vertically spaced disks having central openings therein through which said central tube extends, the outer edge of said disk being attached to said outer tubes to hold them in position.

6. A multiplug rocket engine, as set forth in claim 3, wherein said tubes are flattened at said throat to provide accelerated flow of said fuel or oxidizer through said tubes adjacent said throat for additional cooling.

7. A multiplug rocket engine comprising:
a fuel manifold including:
a base plate with a plurality of aligned openings therethrough,
a side wall extending from the outer edge of said base plate,
a plurality of radial baffles extending from the center of said base to the side wall thereof,
at least one baffle interconnecting adjacent radial baffles, and
a cover extending over said base and connected to said side wall and having a fuel inlet therein;
an oxidizer manifold including:
an outer tube extending around said side wall of said fuel manifold and provided with a plurality of oxidizer inlets in the inner surface thereof,
a web member connected to the inner edge of said tube,
a plurality of collars aligned with said openings in said fuel manifold extending downwardly from said web member,
a plate connected to said outer tube and enclosing the space between said collars and provided with openings therethrough to allow passage of oxidizer from the space between said web and plate into combustion chamber areas, and
an opening in said inner wall in the inner wall of said outer tube to permit flow of oxidizer from said tube into said spaces and through said openings to said combustion chamber; and
a plurality of plugs, each including:
a stem extending through one of said collars into said fuel manifold and having a central passageway therethrough, the lower end of said stem having a generally conical shaped recess therein,
an outer wall formed as a plurality of tubes extending from said conical recess to the bottom of said plug and being formed in a configuration so that adjacent plugs form combustion chamber, throat and expansion chamber areas therebetween,
an end cap covering the bottom of said plurality of tubes so that said fuel is fed through said central passageway into said end caps and through said plurality of tubes into said recess, and
at least one opening extending through the side wall of said plug adjacent said recess to permit flow of fuel from said conical recess into said combustion chamber area.

8. A multiplug rocket engine, as set forth in claim 7, including a central tube extending downwardly from said passageway of said stem to a point adjacent said end cap to carry said fuel from said passageway to said end cap.

9. A multiplug engine, as set forth in claim 8 including a plurality of vertically spaced disks each having a central opening therein, said central tube extending therethrough and the outer edges thereof being connected to said tubes to maintain them in proper configuration.

10. A multiplug rocket engine, as set forth in claim 7, having a skirt which includes:
an outer wall;
a plurality of stems extending from said skirt through said oxidizer manifold into said fuel manifold, each having a central passageway therein through which fuel may pass and having a recess at the lower end thereof;
means on said stems for holding said skirt in place;
an inner wall comprising a plurality of tubes having a configuration conforming to that of said plugs to form combustion chamber, throat and expansion chamber areas between the outer plugs and said inner wall; and
an end cap interconnecting said tubes and said outer wall, said fuel flowing through said central passageway of said stem to said end cap and through said tubes to said recess and through openings in said recess into said combustion chamber area.

11. A plug for a multiplug rocket engine including:
a stem adapted to extend through an oxidizer manifold into a fuel manifold having a central passageway therethrough and being threaded at one end and having a conical recess at the other end;
a central bore in said conical recess;
a central tube extending outwardly from said bore;
an outer wall comprising a plurality of tubes each having one end extending along the surface of said conical recess and then being bent inwardly for a short distance and then outwardly to form a large diameter portion which forms the throat area of the multiplug rocket engine and then tapering inwardly to an outer end;
an end cap covering the outer ends of said tubes; and
a plurality of circumferentially spaced openings extending into said bore so that fuel may be supplied from a fuel manifold through said central opening and said central tube to said end cap and through said tubes to said bore and through said openings into a combustion chamber.

12. A plug for a multiplug rocket engine, as set forth in claim 11, wherein said tubes are flattened at said wide portion to provide an accelerated flow of said fuel through said tubes at this point to provide increased cooling.

13. A multiplug rocket engine, as set forth in claim 12, including a plurality of disks within said tubes having central openings through which said central tube extends, the outer edges thereof engaging said tubes at said ends and adjacent the outer ends thereof to maintain the configuration of said tubes.

14. A plug for a multiplug rocket engine, as set forth in claim 11, including a central counterbore within said bore into which said central tube extends and is secured.

References Cited
UNITED STATES PATENTS

| | | | |
|---|---|---|---|
| 3,115,747 | 12/1963 | Yu | 60—263 |
| 3,150,485 | 9/1964 | Hickerson | 60—258 |
| 3,224,192 | 12/1965 | Mueller | 60—263 |
| 3,270,499 | 9/1966 | Escher | 60—39.46 |

CARLTON R. CROYLE, *Primary Examiner.*

MARK M. NEWMAN, *Examiner.*

D. HART, *Assistant Examiner.*